US010450139B2

United States Patent
Friedl et al.

(10) Patent No.: US 10,450,139 B2
(45) Date of Patent: Oct. 22, 2019

(54) MODULAR STORAGE SYSTEM FOR LARGE NUMBERS OF UNIQUE ITEMS FOR ORDER FULFILLMENT

(71) Applicants: John Friedl, Danville, CA (US); John Voris, Los Gatos, CA (US); Matthew Wolfe, Redwood City, CA (US); Michael Santhanam, San Ramon, CA (US); Vivek Daver, San Ramon, CA (US); Kerrie Yee, San Francisco, CA (US)

(72) Inventors: John Friedl, Danville, CA (US); John Voris, Los Gatos, CA (US); Matthew Wolfe, Redwood City, CA (US); Michael Santhanam, San Ramon, CA (US); Vivek Daver, San Ramon, CA (US); Kerrie Yee, San Francisco, CA (US)

(73) Assignee: THREDUP INC., San Francisco, CA (US)

( * ) Notice: Subject to any disclaimer, the term of this patent is extended or adjusted under 35 U.S.C. 154(b) by 0 days.

(21) Appl. No.: 15/727,542

(22) Filed: Oct. 6, 2017

(65) Prior Publication Data

US 2019/0108604 A1    Apr. 11, 2019

(51) Int. Cl.
*B65G 1/16* (2006.01)
*B65G 1/06* (2006.01)
*G06Q 50/28* (2012.01)
*G06Q 10/08* (2012.01)
(Continued)

(52) U.S. Cl.
CPC ............... *B65G 1/16* (2013.01); *B65G 1/045* (2013.01); *B65G 1/06* (2013.01); *B65G 1/1373* (2013.01); *G06Q 10/087* (2013.01); *G06Q 10/0832* (2013.01); *G06Q 50/28* (2013.01)

(58) Field of Classification Search
CPC ........................................................ B65G 1/16
See application file for complete search history.

(56) References Cited

U.S. PATENT DOCUMENTS

| 7,370,005 | B1 * | 5/2008 | Ham | ................ | G06Q 10/06315 |
| | | | | | 705/28 |
| 2003/0065421 | A1 * | 4/2003 | Didriksen | ................ | B65G 1/00 |
| | | | | | 700/230 |

(Continued)

*Primary Examiner* — Thomas Randazzo
(74) *Attorney, Agent, or Firm* — Fenwick & West LLP

(57) ABSTRACT

An order fulfillment system stores any number of items in an item population. The item population includes any number of unique items. The order fulfillment system includes an input system, a storage system, and a packing system. The input system receives items for the population, prepares the received items for storage, and translates the items to the storage system. The storage system stores items in unique storage locations until the items are ordered by a customer of the order fulfillment system. The packing system prepares items orders, packages the items of the order, and sends the orders to the customer which ordered the items. The order fulfillment system also includes storage and fulfillment policies for determining storage locations and packing stations, respectively. Operators of the order fulfillment system can perform actions in the order fulfillment system to facilitate storing and fulfilling orders.

21 Claims, 5 Drawing Sheets

(51) Int. Cl.
*B65G 1/137* (2006.01)
*B65G 1/04* (2006.01)

(56) References Cited

U.S. PATENT DOCUMENTS

| | | | |
|---|---|---|---|
| 2008/0008568 A1* | 1/2008 | Harris | B65G 1/00 |
| | | | 414/281 |
| 2008/0154709 A1* | 6/2008 | Ham | G06Q 10/06315 |
| | | | 705/7.25 |
| 2011/0259711 A1* | 10/2011 | Broers | B65G 21/18 |
| | | | 198/347.1 |
| 2014/0108287 A1* | 4/2014 | Waddington | G06Q 10/06 |
| | | | 705/334 |
| 2016/0023853 A1* | 1/2016 | Gaenz | B65G 61/00 |
| | | | 414/799 |
| 2018/0174124 A1* | 6/2018 | Jones | G07G 1/0018 |

\* cited by examiner

MODULAR STORAGE SYSTEM FOR LARGE NUMBERS OF UNIQUE ITEMS FOR ORDER FULFILLMENT

BACKGROUND OF THE INVENTION

This disclosure relates generally to a modular storage system, and more specifically to a garment storage system for order fulfillment. storage facility for order fulfillment. The number of items a retailer maintains for order Traditionally, retailers have maintained a population of items at a store-front or fulfillment is limited to increase the efficiency of selling and maintaining the population. Limiting the number of items can lead to a reduced ability of the retailer to offer a wider range of items for order fulfillment. As some examples, limiting the number of items can include offering a set number of sizes, a set number of item types, a particular item material, a particular item style, etc. Typically, this results in retailers specializing in subsets of item types and maintain specialized item populations.

However, modern technology has increased the ability of retailers to maintain an increasing number of items in the population that are available to customers for order fulfillment. With the increase of the number of items in the population, systems for efficient order fulfillment have become a complex challenge. Traditional order fulfillment systems without automation become progressively inefficient with an increasing number of items in a population. Described herein is a modular system that allows for an item population to be stored and retrieved as part of an efficient and automated order fulfillment system.

SUMMARY OF THE INVENTION

An order fulfillment system receives any number and type of item for storage in the population. The order fulfillment system stores the items in the population until that item is ordered by a customer. Hence, any customer of the order fulfillment system can order any number or type of items from the population. To enable this, each item of the population is individually classified and tracked through an input system, storage system, and packing system of the order fulfillment system.

Each item of the population is received via an input system and prepared for storage. Preparing an item for storage includes classifying the item, logging the item, and readying the item for storage in a storage system. Each prepared item is assigned a unique identifier which is used to track the item in the order fulfillment system. Further, the unique identifier is used by customers of the order fulfillment system to order the item. Generally, each item is associated with a visual representation of the unique identifier (e.g., a QR code) such that the item can be monitored within the order fulfillment system.

Once prepared for storage, each item is transported to the storage system via an inbound conveyor system (i.e. an overhead trolley or conveyor system). The order fulfillment system determines a storage location for each item based on the classification of the item and a storage policy of the order fulfillment system. The order fulfillment system translates the item to a storage platform associated with the storage location. Subsequently, an operator of the order fulfillment system translates the item from the inbound conveyor to the storage carousel including the storage location. The storage carousel is actuated such that the operator can efficiently store the item in the storage location. In some configurations, the operator uses a carousel interaction station to store the item. In still configurations, the operator uses a fulfillment device (i.e. a mobile computing device to facilitate) storing the item. Storing the item associates the unique identifier of the item with the storage location.

A customer can order any number of items from the population using the order fulfillment system. Once ordered, the items are retrieved from the storage system based on a fulfillment policy of the order fulfillment system. Ordered items are retrieved from their storage locations and translated to the packing system via an outbound conveyor system (i.e., an overhead trolley system). Each item from the order is translated to a fulfillment station and prepared for fulfillment. Preparing orders for fulfillment can include readying the order, verifying the order, and packing the order. Once the items from an order are prepared for fulfillment, they are sent to the customer and the items exit the population.

At various points, operators of the order fulfillment can facilitate efficient order fulfillment. Operators can prepare items for storage, translate items to various systems, store items, retrieve items, prepare items for fulfillment, etc. Generally, an operator of the order fulfillment system is a person interacting with the various systems and elements of the order fulfillment system. In some cases, the operator can be an automated system such as a robotic device. Additionally, each operator can include a fulfillment device (i.e. a handheld device) to further facilitate efficient order fulfillment.

BRIEF DESCRIPTION OF THE DRAWINGS

The invention has other advantages and features which will be more readily apparent from the following detailed description of the invention and the appended claims, when taken in conjunction with the accompanying drawings, in which:

The figures and the following description depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

I. Order Fulfillment System

Figure 1:
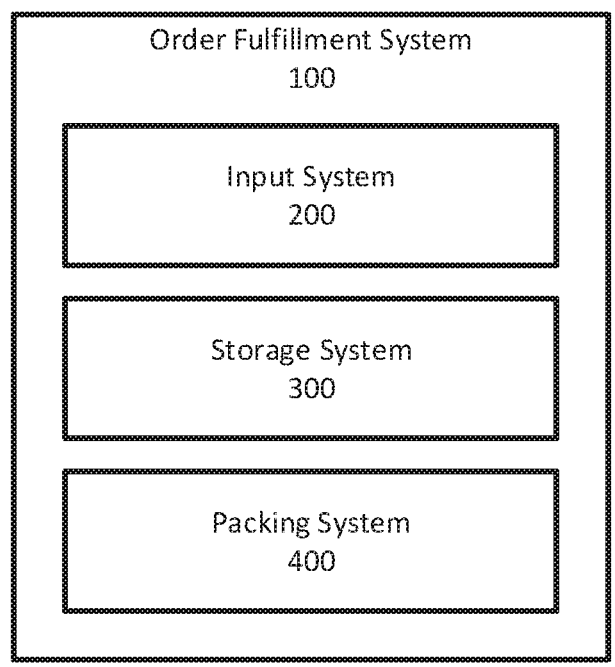
FIG. 1 is an illustration of an order fulfillment system, according to one example embodiment.

FIG. 1 is an illustration of an example embodiment of an order fulfillment system 100 that allows for any number of items in a population. The order fulfillment system 100 includes an input system 200, a storage system 300, and a packing system 400. In various other embodiments, the order fulfillment system 100 can include additional or fewer systems, or the systems may be combined in another manner.

Broadly, the order fulfillment system 100 fulfills orders received from customers for items stored in the population. To do so, the input system 200 receives items and classifies the items (e.g., size, make, material, quality, etc.). Each item received by the input system 200 is independently classified and tracked within the order fulfillment system 100. In some embodiments, the items are stored in a storage unit. The input system 200 translates the classified items to the storage system 300. The storage system 300 stores a classified item until the item is ordered. Once the item is ordered, the storage system 300 retrieves the item from storage and translates the item to the packing system 400. The packing system 400 packages and sends the item to the customer from which the order was received.

Figure 2:
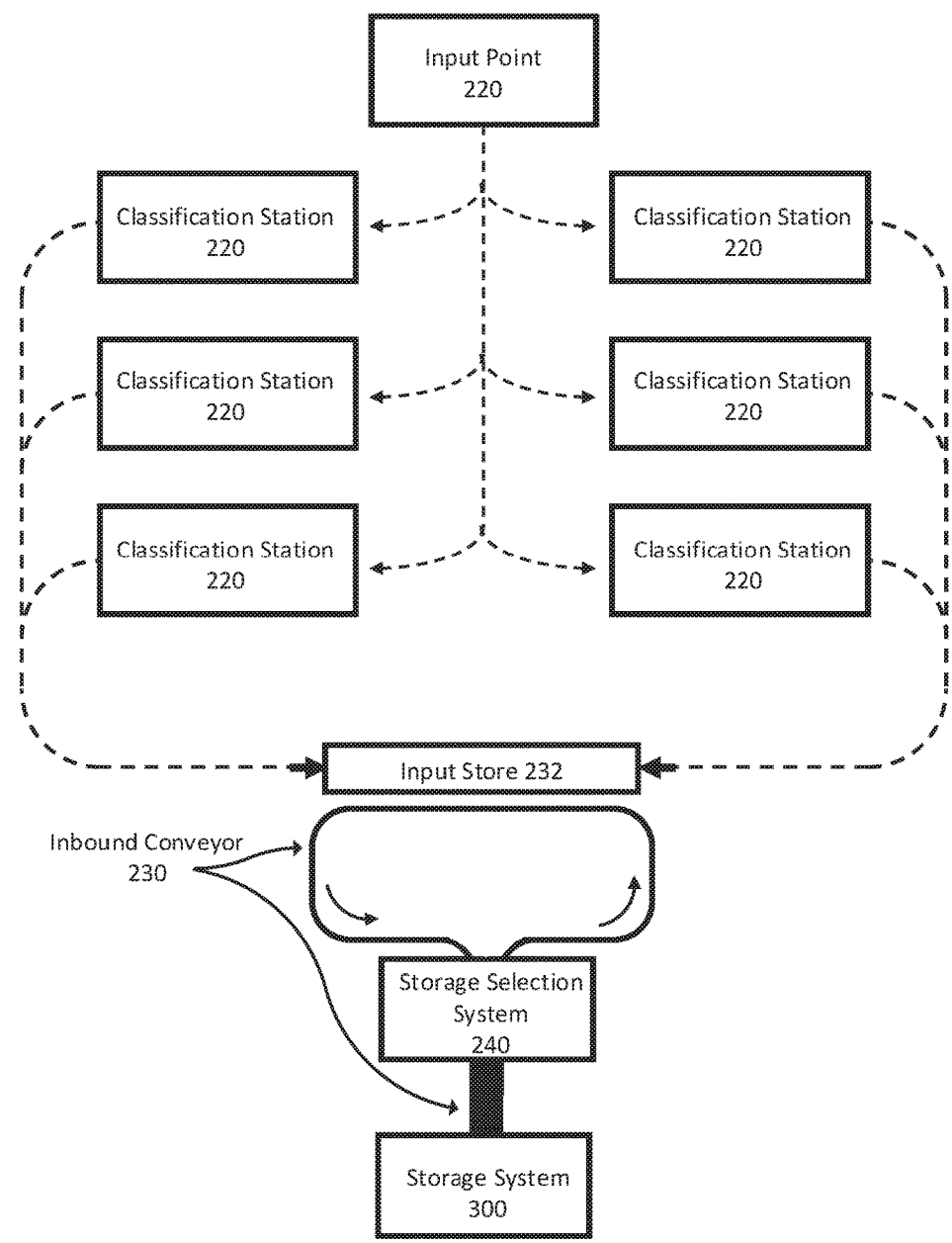
FIG. 2 is an illustration of an input system of the order fulfillment system, according to one example embodiment.

FIG. 2 is an illustration of the input system 200 in one example embodiment. In the illustrated example, the input system 200 includes an input point 210, a group of classification stations 220, an inbound conveyor 230, an input store 232, and a storage selection system 240. The input system 200 is coupled to the storage system 300 by an inbound conveyor 230. FIG. 2 is a single embodiment of the storage system 200. In other embodiments, the storage system 200 can include any number of additional (or fewer) elements and the input system 200 may be arranged in any number of configurations.

The input point 210 represents the origin point for items within the order fulfillment system 100. In one example, the input point 210 can represent a mail delivery service which delivers items to the order fulfillment system 100 from suppliers of the items. In other examples the input point can be a store front, the output of a fabrication system, a rental facility, a document storage facility, or any other system that requires random access of unique items, etc.

Further, the order fulfillment system 100 may have any number of input points 210 receiving items for the population of the order fulfillment system 100 in any combination of methods. Items received at the input point 210 are transported to a classification station 220. In one embodiment, the items are transported to the classification station 220 by an operator of the order fulfillment system 100. In other embodiments, the items are automatically transported to the classification station 220 (e.g., via a conveyor, garment-on-hanger (GOH) conveyor, a robotic system, auto guided vehicle, slide, chute etc.).

The classification station 220 receives items from the input point 210 and prepares them for storage in the storage system 300. There can be any number of classification stations 220 preparing items for storage within the order fulfillment system 100. Preparing the items for storage can include classifying the item, logging the item, and readying the item. In some configurations, preparing the item for storage can include scanning a previously already associated unique identifier for the item (e.g., the item was previously prepared, classified, logged, etc.). In another embodiment, preparing the item is accomplished by an operator of the order fulfillment system 100. In still other embodiments, preparing the item for storage is accomplished by automated systems (e.g., a machine vision system, robotic item handlers, etc.).

Classifying the item determines a set of item characteristics for the item. The item characteristics can include determining the type of item, the size of the item, the brand of the item, the color of the item, or any other type of item classification. Logging the item can include generating a unique identifier for each item. The unique identifier is associated with the set of item characteristics determined during the classification of the item. The unique identifier can be stored by the order fulfillment system 100 and is made available to customers such that they may place an order for the item using the unique identifier. In some embodiments, logging the item also creates a visual depiction of the item (e.g., a photo, a video, a drawing etc.) such that customers may access the visual representation of the item when generating an order. Readying the item prepares the item for storage in the storage system 300. In one embodiment, readying the item stores the item in (or on) a storage unit. The storage unit can be any storage mechanism such that the item is storable, trackable, and transferrable within the order fulfillment system 100. As some examples, readying the item can include placing the item in a box, tote, or bin, placing the item in a bag, or hanging an item on a hangar, or in some cases, not placing the item in a storage unit at all. Generally, each storage unit is affixed with a visual icon representing the unique identifier for the item of the storage unit. In another embodiment, a preexisting visual icon on the storage unit is associated with the unique identifier of the item. As some examples, the visual icons that can be associated with a unique identifier can be a bar code, a QR code, a label, or any other visual representation method. Whatever the case, each storage unit is associated with a unique identifier of an item in the population and each storage unit includes a visual icon representing that association.

After the item is prepared for storage, the storage units are transported to the inbound conveyor 230. The inbound conveyor 230 couples the input system 200 to the storage system 300 and translates items from the input system 200 to the storage system 300. The inbound conveyor 230 is any system that can transport storage units from classification stations 220 (or input store 232) to the storage system 300. For example, the inbound conveyor 230 can be an overhead trolley conveyor system for transporting items on a hangar. In other embodiments, the inbound conveyor can be a conveyor belt for transporting boxes, a pneumatic tube system for transporting envelopes, etc. In one embodiment, an operator of the order fulfillment system 100 transports the storage units to the inbound conveyor 230. In other embodiments, the storage units are automatically transported to inbound conveyor 230 (e.g., automated robotic transport, additional conveyor systems, etc.). In some examples, the storage units are placed on an input store 232 before being transferred to the inbound conveyor 230 (either by an operator or automatically). The input store 232 can be any system capable of temporarily storing the storage units. For example, the input store 232 can be a table, a bin a basket, a hanging storage rack, etc.

In some embodiments, the inbound conveyor 230 is coupled to a storage selection system 240. The storage selection system 240 determines a storage location for each storage unit as the storage unit enters the storage system 300 via the inbound conveyor 230. Generally, the storage selection 240 system reads the visual icon on the storage unit using an image detection system (e.g., a camera system with machine vision, a laser bar code reader, etc.). In some embodiments, the storage selection system can also further classify items of the storage unit with the image detection system. For example, the storage selection system 240 can determine the size of a storage unit (e.g., size of a box), or the size of an item in relation to the storage unit (e.g., length of an item on a hangar). The storage selection system 240 determines a storage location for each item based on the unique identifier and any additionally classified information. After determining a storage location for the storage unit, the inbound conveyor 230 translates the storage unit to the storage location (e.g., a storage platform, storage carousel, etc.). Further, the storage location and additionally classified information is associated with the unique identifier and item characteristics for the item and stored by the order fulfillment system.

Figure 3:
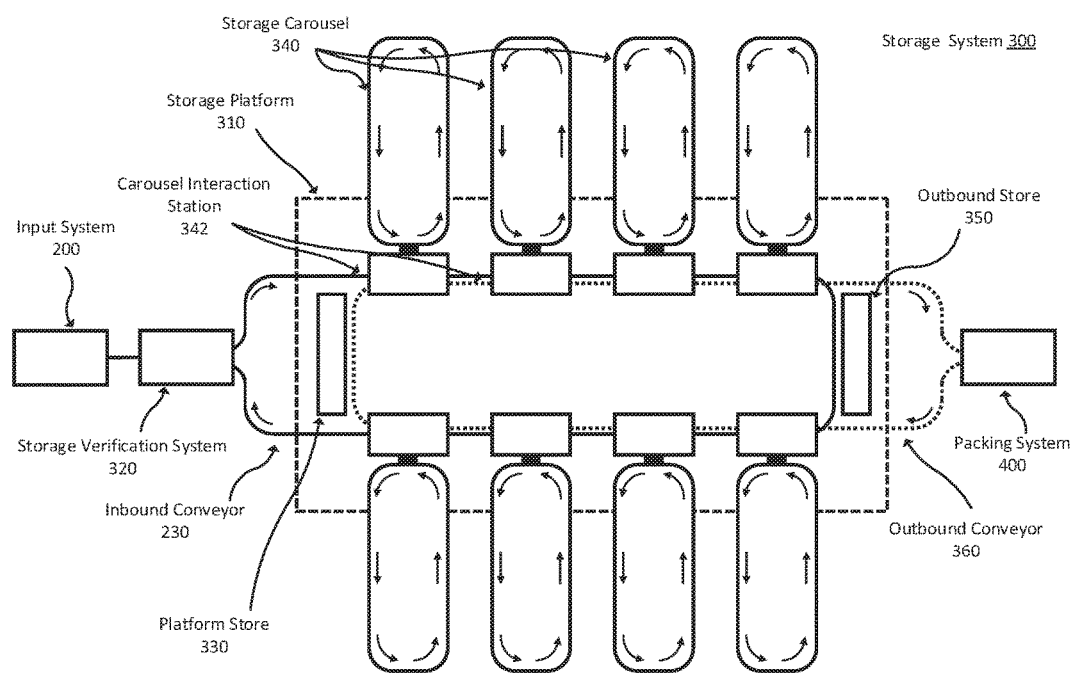
FIG. 3 is an illustration of a storage system of the order fulfillment system, according to one example embodiment.

The items received by the input system 200 are stored by the storage system 300. FIG. 3 is an illustration of an example embodiment of the storage system 300. In the illustrated example, the storage system 300 includes a storage platform 310, a storage verification system 320, an inbound conveyor 230, a platform store 330, a set of storage carousels 340, a set of carousel interaction stations 342, an outbound store 350, and an outbound conveyor 360. The input system 200 is coupled to the storage system 300 by the inbound conveyor and 230 to the packing system 400 by the outbound conveyor 360. FIG. 3 is a single embodiment of the storage system 300. In other embodiments, the storage system 300 can include any number of additional (or fewer elements) and the storage system 300 may be arranged in any number of configurations.

The storage system 300 includes any number of storage platforms 320. A storage platform 310 is any structure or surface capable of supporting and coupling the elements of the storage system 300. Storage platforms 310 may be stacked one atop the other, positioned side by side, or positioned in any other two or three dimensional geometry such that the input system 200 can access more than one storage platform 310. Each storage platform 320 is coupled to the inbound conveyer 230 such that storage units can be translated to their determined storage location. That is, each storage location is associated with a storage platform 320 and storage units are translated to the appropriate storage platform for the determined storage location. In other configurations, determining the storage location for the storage unit includes determining the storage platform 310 for the storage unit. The storage platforms 310 can be arrayed in any manner including a two-dimensional plane, stacked in three dimensions, or a combination of the two.

In some embodiments, the inbound conveyor 230 is coupled to a storage verification system 310. The storage verification system 320 determines that a storage unit is at the appropriate storage platform 310 as a storage unit enters the storage platform 310 via the inbound conveyor 230. That is, the storage verification 320 system reads the visual icon on the storage unit using an image detection system (e.g. a camera system with machine vision). The storage verification system 310 verifies if the storage unit is at the appropriate storage platform 310 by accessing the storage location of the item associated with the visual icon. If the storage unit is at the appropriate storage platform 310 it proceeds to be stored in the storage system 300. If the item is not at the appropriate storage platform 310 it generates an item error. In this case, the item generating the item error is translated to the appropriate storage platform 310. In some embodiments, an operator of the order fulfillment system verifies that storage units are at the appropriate storage platform 310.

In some embodiments, the storage system includes a platform store 330. The platform store 330 stores storage units received from the input system 200 via the inbound conveyor 230. The platform store 330 is any system capable of temporarily storing the storage units. For example, the platform store 330 can be a table, a bin, a basket, a hanging storage rack, etc. In some embodiments, the storage units are automatically transferred from the inbound conveyor to the platform store 230. In other embodiments, the storage units are transferred to the platform store 330 by an operator of the order fulfillment system 300. Additionally, the platform store can be used as a staging area for operators, robots, automated transfer devices, etc.

Additionally, the storage system 300 includes any number of storage carousels 340. The storage carousels 340 store items held by storage units until the items are ordered by a customer of the order fulfillment system 100. Each storage carousel 340 is configured to store any number of storage units. Further, each storage carousel 340 is configured with any number of storage locations. Generally, the storage units are stored in the storage locations. The storage locations include a visual icon of the storage location affixed to that storage location (e.g. a bar code, a QR code, a label, etc.). In one example, the storage carousel is an overhead garment conveyor system, with each storage location of the conveyor system including a QR code. In some configurations, the storage carousels are stacked on top of one another using a common support structure. For example, the storage carousels can be stacked three high and accessed via a floor level storage platform, a first floor storage platform, and a second floor storage platform.

When a storage unit is stored in a storage location, the storage unit is associated with the storage location. Accordingly, the order fulfillment system 100 stores the storage location of each storage unit. Thus, the order fulfillment system 100 maintains the storage location for each item of the population. Storing the storage unit in a storage location can be accomplished by an operator of the order fulfillment system 100 or by automatic means. Similarly, associating the storage unit with a storage location can be accomplished by an operator of the order fulfillment system (e.g., scanning the QR code of the storage unit and the QR code of the storage location to associate them) or automatically (e.g., an image capture system with machine vision).

Each storage carousel 340 is actuatable such that the storage locations can translate (e.g., rotate) about the storage carousel 340. In practice, translating the storage carousel 340 facilitates efficient storage and retrieval of the storage units. A storage policy and a fulfillment policy (described in Section IV) of the order fulfillment system govern efficient storage and retrieval of items and storage units. In some embodiments, the storage carousel 340 can be actuated with an actuation mechanism (e.g., a motor, a pneumatic system, the order fulfillment system 100, etc.). In other embodiments, the storage carousel 340 can be actuated by an operator of the order fulfillment system 100 (e.g., a hand crank, operator actions, etc.). While the storage carousels 340 of FIG. 3 illustrate the storage carousels 340 translating in one direction, the storage carousels 340 can translate in any direction during item storage or item retrieval.

In some embodiments, storage units are transferred from the platform store 330 to a storage carousel 340. In one configuration, the storage units are transferred from the platform store 330 to the storage carousel 340 by an operator of the order fulfillment system 100. In other configurations, the storage units are automatically transferred from the platform store 330. In some embodiments, the storage units are transferred directly from the inbound conveyor 230 to the storage carousels 340.

In some configurations, storage carousels 340 include a carousel interaction station 342. The carousel interaction station 342 facilitates the efficient and safe storage (and retrieval) of storage units from the storage carousels 340. Generally, each storage carousel 340 is adjacent to its corresponding carousel interaction station 342. Further, the inbound conveyor 230 and outbound conveyor 360 are proximal to the carousel interaction stations 342 to increase efficiency of storing and retrieving storage units. In one embodiment, the carousel interaction station 342 includes a carousel status indication system indicating when to interact with the storage carousel. For example, the status indication system can indicate when it is safe to interact with a storage carousel, when a storage unit is ready for retrieval, which storage units to store/retrieve, etc. In various configurations, the status indication system can be a series of lights, a display system, or an audio feedback system.

In another embodiment, the carousel interaction station 342 can control the actuation of the storage carousel 340. For example, the carousel interaction station 352 can include a control unit for the actuation mechanism of the storage carousel. In another example, the carousel interaction station 342 can include an area for an operator to safely actuate the storage carousel 340.

In another embodiment, the carousel interaction station 352 can include a storage rack. The storage rack can be any system that allows the temporary storage of storage units while they are stored on or retrieved from the storage carousels 340 (e.g., a table, a horizontal storage bar, etc.).

When an item is ordered by a customer of the order fulfillment system 100 using a unique identifier for the item, the associated storage unit is retrieved from the storage system 300 and transported to the packing system 400. Once ordered, the order fulfillment system 100 determines the storage location of the storage unit holding the item. The order fulfillment system then actuates the corresponding storage carousel 340 such that the storage unit is easily retrievable from the storage carousel 340 (e.g., rotates the storage location to the carousel interaction station 342). In another embodiment, an operator of the order fulfillment system 100 actuates the storage carousel 340 such that the storage unit is retrievable from the storage location.

Generally, when a storage unit is retrieved from a storage carousel 340, the storage unit is disassociated from the storage location. Disassociating the storage unit from the storage location allows the order fulfillment system 100 to store a new storage unit in that storage location. In one embodiment, disassociating the storage unit from the storage location is accomplished by an operator of the order fulfillment system (e.g. scanning the QR codes of the storage unit and the storage location). In another embodiment, disassociating the storage unit from the storage location is accomplished automatically (e.g., image capture system with machine vision).

In some embodiments, multiple items may be ordered by the same customer. In these situations, the corresponding storage units can be on a number of different storage carousels 340 and/or storage 310 platforms of the storage system 300. Generally, the order fulfillment system 100 actuates the storage carousels including the storage units corresponding to the items of the order such that the items can be efficiently retrieved for packing.

When a storage unit is retrieved from a storage carousel 340, the storage units are transported to the outbound conveyor 360. The outbound conveyor 360 is any system that can translate storage units from the storage system 300 (i.e. the storage carousels 340, the storage platform 310, or the outbound store 350) to the packing system 400. In one example, the outbound conveyor 360 is an overhead trolley conveyor system for transporting items. In another example, the outbound conveyor can be a conveyor belt or pneumatic tube system. In one embodiment, an operator of the order fulfillment system transports the storage units to the outbound conveyor 360. In other embodiments, the storage units are automatically transported to outbound conveyor 360 (e.g., automated robotic transport, conveyor systems, etc.). In some configurations, the storage units are placed on an outbound store 350 (e.g., a storage rack, a shelf, etc.) before being transferred to the outbound conveyor (either by an operator or automatically).

Any number of outbound conveyors can be coupled to the packing system 400 (e.g., from multiple storage platforms 310). In some configurations multiple outbound conveyors are consolidated into a single outbound conveyor by a conveyor consolidation system. The conveyor consolidation system acts to translate storage units from multiple conveyors to a single outbound conveyor system (automatically or by an operator). In some embodiments, the conveyor consolidation system may be included in item packing system 300.

Figure 4:
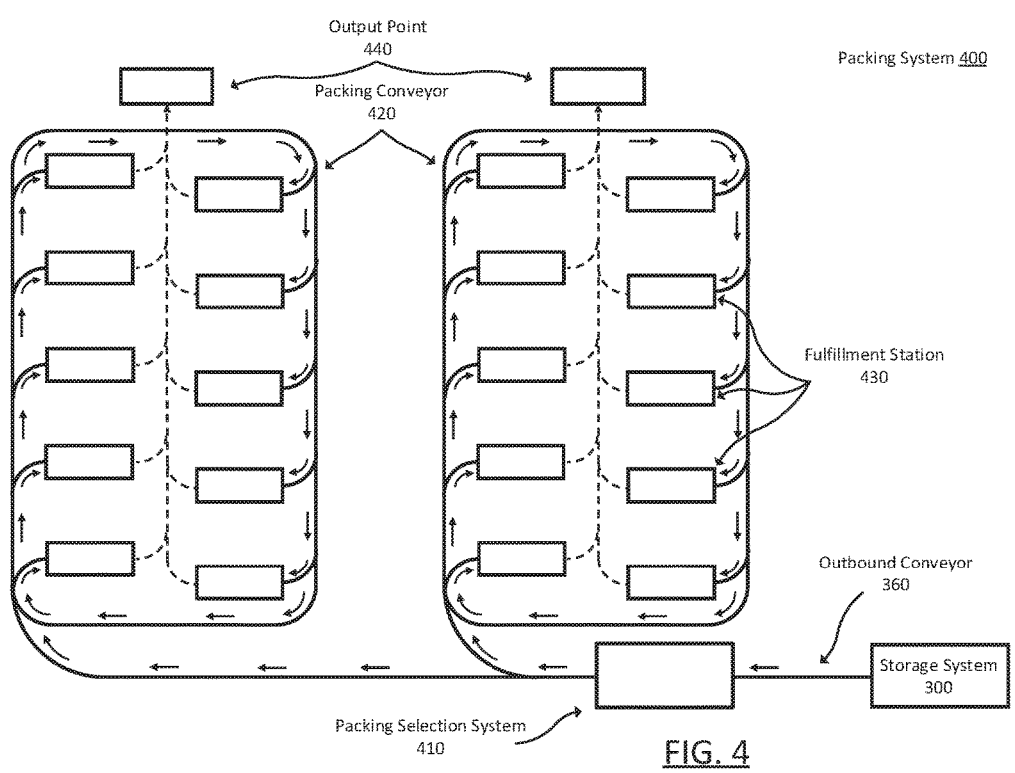
FIG. 4 is an illustration of a packing system of the order fulfillment system, according to one example embodiment.

The items of an order retrieved from the storage system are prepare for fulfillment by the packing system 400. FIG. 4 is an illustration of an example embodiment of the packing system 400. In the illustrated example, the packing system 400 includes a packing selection system 410, any number of packing conveyors 420, any number of fulfillment stations 430, and an output point 440. The item packing system 400 is coupled to the storage system 300 by the outbound conveyor 360. Note that FIG. 4 is a single embodiment of the item packing system. In other embodiments, the item packing system can include any number of additional (or fewer elements) and the item packing system may be arranged in any number of configurations.

In the illustrated embodiment, the packing system 400 includes a packing selection system 410. The packing selection system 410 determines a fulfillment station 430 for each storage unit as the storage unit enters the packing system 400 via the outbound conveyor 360. Generally, the packing selection system 420 reads visual icon on the storage unit using an image detection system (e.g. a camera system with machine vision) to determine the item within the storage unit. Accordingly, the packing selection system 410 determines a fulfillment station 430 for each storage unit based on the order including the item held by the storage unit. That is, all items from a single order are translated to the same fulfillment station. The order fulfillment system uses a fulfillment policy (described in Section IV) to determine fulfillment stations 430.

The packing system 400 includes any number of packing conveyors 420. A packing conveyor 420 is coupled to the outbound conveyer 360 such that storage units can be translated to the determined fulfillment station 430. That is, each fulfillment station 430 is associated with a packing conveyor 420 and storage units are translated to the appropriate packing conveyor 420 for the determined fulfillment station 430. Each packing conveyor 420 is coupled to any number of fulfillment stations 430 such that the storage units can be transferred from the packing conveyor 420 to the fulfillment stations 430. Additionally, each packing conveyor 420 is configured such that storage units can be continuously circulated about the packing conveyor 420 until the storage unit is able to be packaged at a fulfillment station 430. For example, the packing conveyor 420 can be a recirculating conveyor belt or overhead garment conveyor system.

The packing system 400 includes any number of fulfillment stations 430. A fulfillment station receives 430 item storage units from the packing conveyor 420 and prepares orders for fulfillment. There can be any number of item fulfillment stations 430 within the packing system 400. Preparing orders for fulfillment can include readying the order, verifying the order, and packing the order. In one embodiment, preparing the order for fulfillment is accomplished by an operator of the order fulfillment system 100. In other embodiments, preparing the order for fulfillment is accomplished by automated systems (e.g., a machine vision system, robotic item handlers, etc.).

Readying the order can include removing items of the order received at the fulfillment station from their item storage units and preparing the item for packing (e.g., cleaning, folding, etc.). Verifying the order can include reading the visual icon of the storage unit received at the fulfillment station and determining that the received storage unit is associated with the order being prepared for fulfillment. If an item not associated with the order being prepared at the receiving fulfillment station 430, an item error is generated and the item is not included in the order being prepared. Packing the item order includes placing the items of the order received at the fulfillment station in a container for transport to the customer. For example, the container can be an envelope, a box, a tube, etc.

Once an order is prepared for fulfillment at the fulfillment station 430, the order is translated to the output point 440. The output point 440 represents the terminal point for items within the order fulfillment system 100. Generally, once an order and its associated items reaches the output point, the items exit the population and the order is considered fulfilled by the order fulfillment system 100.

In one example, the output point 440 can represent a mail delivery service which sends orders to customers of the order fulfillment system 100. In another example, the output point can be a store front. Further, the order fulfillment system 100 may have any number of output points 210 sending orders to customers of the order fulfillment system 100 in any combination of methods. In one embodiment, the orders are transported to the output point by an operator of the order fulfillment system 100. In other embodiments, the orders are automatically transported to the output point (e.g., via a conveyor belt, a robotic system, etc.).

II. Order Fulfillment System Operators

The order fulfillment system 100 can include any number of order fulfillment system operators, hereafter operators. Generally, the operators are persons operating within the order fulfillment system to facilitate storing items and fulfilling orders. In some embodiments, the operators can also include any number of automated systems (e.g., a robotic system, additional conveyor systems, etc.). Within the order fulfillment system 100, the operators can take any number of actions including preparing items for storage, translating items between elements of the order fulfillment system, storing items, retrieving items, preparing orders for fulfillment, or correcting item errors. These actions are described in more detail in regards to FIGS. 2-4.

In some embodiments, each operator includes a fulfillment device. The fulfillment device provides each operator with instructions from the order fulfillment system. The instructions can include a set of actions to perform within the order fulfillment system. The fulfillment device can be any type of modern device capable of connecting to the order fulfillment system (e.g., a cell-phone, a tablet computer, a hand-held computer, etc.).

In one example, an operator receives instructions from the order fulfillment system 100 to translate item storage units from a platform store to storage carousels. The operator proceeds to the appropriate storage platform and manually translates storage units to the designated storage carousels. In some embodiments, the fulfillment device can include a display indicating which storage carousels to store the storage units on, a visual representation of the correct storage units to store, etc. The operator stores the storage units on the storage carousel and associates the storage units with the storage location using a visual detection system of the fulfillment device.

In another example, an operator receives instructions from the control system to correct an item error. The operator proceeds to the appropriate storage platform (or fulfillment station), obtains the storage unit generating the item error, and translates the storage unit to the appropriate storage platform (or fulfillment station).

The previous examples are meant as general examples of an operator using the fulfillment device within the order fulfillment system and are not limiting. The operators can use the fulfillment device to perform any action or combination of actions within the order fulfillment system.

III. Example Process

Figure 5:
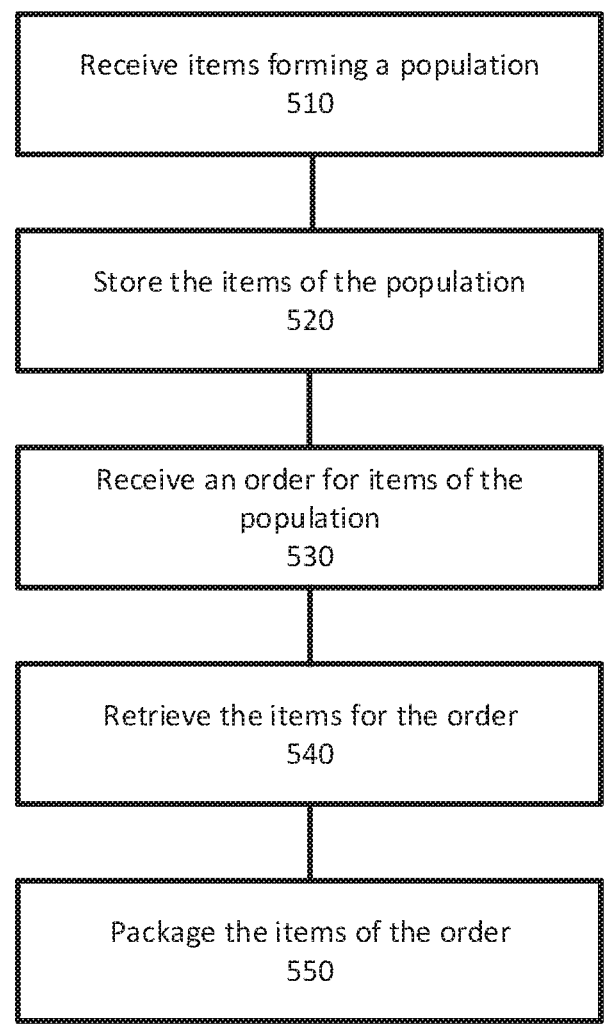
FIG. 5 is process flow for the storage and retrieval of an item of an order in the order fulfillment system, according to one example embodiment.

FIG. 5 is a flow diagram of one method for storing and retrieving items as part of an order fulfillment, according to one example embodiment. In the example described below, the process is performed by the order fulfillment system of FIGS. 1-4. In this example, the order fulfillment system 100 stores garments until they are ordered by a customer of the order fulfillment system 100. Other embodiments may include different and/or additional steps, or perform the steps in different orders.

In FIG. 5, the order fulfillment system 100 receives items from users of the order fulfillment system. In one example, the items are received via mail at the input point 210 of the input system 200. The items can be received via an item shipping service (e.g., the mail, courier, etc.). Each received item is translated to a classification station 220. In one embodiment, the item is translated by an operator of the order fulfillment system.

For example, a user of the order fulfillment system 100 sends a green Versace dress to the order classification system 100 via mail. The dress is received at the input point 210 and transported to a classification station 220 by an operator of the order fulfillment system 100.

The item is prepared for storage in the storage system 300 at the item classification station 220. In one example, preparing the item for storage determines a set of item characteristics for the item (e.g., make, model, size, visual representation, etc.). Further, preparing the item for storage generates a unique identifier for the item and associates the set of characteristics with the unique identifier. The order fulfillment system 100 stores the unique identifier and associated characteristics. In some cases, the item is prepared for storage by placing the item on a storage unit. The storage unit includes a visual icon that is associated with the unique identifier for the item. In one embodiment, the item is prepared for storage by an operator of the order classification system.

For example, a user of the order fulfillment system prepares the dress for storage at a classification station. The dress is classified as green, made by Versace, size 6, and an image of the dress is obtained. An operator generates a unique identifier for the dress and associates the item characteristics with the unique identifier. The operator places the dress on a hangar including a visible QR code. The operator scans the QR code of the hangar and associates the QR code with the unique identifier.

The order fulfillment system 100 stores 520 the item in the storage system 300. That is, an operator translates the storage unit containing the item to the inbound conveyor 230. The inbound conveyor 230 translates the storage unit to the storage system 300. While translating, the storage selection system 240 further classifies the storage unit and determines a storage location for the storage unit. The inbound conveyor 230 translates the storage unit to the storage platform 310 associated with the determined storage location.

For example, an operator transports the dress on the hangar to an overhead garment trolley system that couples the input system to the storage system. The trolley system translates the dress towards the storage system. The storage selection system captures an image of the dress and hangar and determines the length of the dress as the dress translates along the trolley system. The storage selection system reads the QR code on the hangar and adds the length of the dress to the set of item characteristics. Based on the set of characteristics, control system determines a storage location for the dress. The trolley system translates the dress and hangar to the storage platform associated with the storage location.

Continuing, the storage unit arrives at a storage platform 310 of the storage system 300 via the inbound conveyor 230. Upon arrival to the storage platform 310, the storage verification system 320 verifies that the storage unit is at the correct storage platform 310. The storage unit is translated to a platform store 330 on the storage platform. In one embodiment, the storage units are translated to the platform store 330 by an operator of the order fulfillment system.

For example, the dress and hangar arrive at the storage platform of the storage system associated with the determined storage location via trolley system. The storage verification system reads the QR code and verifies that the dress and hangar have arrived at the platform associated with the determined storage location. The dress and hangar are transported off of the trolley system and onto a horizontal storage rail by an operator of the order fulfillment system.

Moving forward, the storage unit is translated from the platform store 330 to the storage carousel 340 associated with the determined storage location by an operator of the order fulfillment system 100. The order fulfillment system 100 advances the storage carousel such that the determined storage location accessible at the carousel interaction station 342. The operator stores the storage unit in the storage location and associates the storage location with the storage unit.

For example, the dress and hangar are transported to a garment storage carousel containing the determined storage location. The dress and hangar are stored on a horizontal storage rack as they are transported to the storage carousel by an operator of the order fulfillment system. The order fulfillment system actuates the garment storage carousel such that the storage location for the dress and hangar rotates to the carousel interaction station and is accessible by the operator. The operator hangs the hangar on a storage location of the garment storage carousel. The operator scans the QR code of the hangar and a QR code of the storage location to associate the storage location with the unique identifier of the dress. Accordingly, the exact storage location of the dress is known by the order fulfillment system.

Returning to FIG. 5, the order fulfillment system 100 receives 530 an order for items of the population from a customer of the order fulfillment system. When ordering, the customer accesses the set of characteristics of the items using the unique identifier of the items within the order fulfillment system 100. Additionally, the customer orders the items using the unique identifiers of the items in the order fulfillment system 100. Consequently, the order fulfillment system determines the storage location for the items of the order.

For example, a customer uses the order fulfillment system to shop for a new outfit. The customer accesses the set of characteristics for the dress using the unique identifier. As the customer finds the dress desirable, the customer orders the dress using the unique identifier. Similarly, the customer orders a silver necklace to accompany the dress. The silver necklace was similarly stored by the order fulfillment system. As the unique identifiers for the dress and necklace were previously associated with the specific storage location for each item, the order fulfillment system readily determines the storage locations the two items of the order.

Continuing, the order fulfillment system 100 retrieves 540 the items of the order from the storage system 300. To do this, the order fulfillment system advances 100 the items in the order to the order interaction station 342 on their respective storage carousels 340. An operator (or operators) of the order fulfillment system 100 retrieves the items from the storage locations of the storage carousels 340. The operators translate the items of the order to the outbound conveyor 360 of the storage platform 310.

For example, the order fulfillment system retrieves the dress and the necklace from the storage system. In this example, the dress and the necklace are stored in storage locations on separate storage platforms and storage carousels. The order fulfillment system advances the first garment storage carousel such that the dress is retrievable at the carousel interaction station. Similarly, the order fulfillment system advances the second garment storage carousel such that the necklace is retrievable at the carousel interaction station. An operator at each storage carousel retrieves the respective items. Upon retrieval, the operator dissociates the item storage location from the items of the order by scanning the QR codes of the storage locations and their respective hangars. The operator transports the dress and necklace to an outbound trolley system of the storage platform.

Returning to FIG. 5, the order fulfillment system 100 packages 550 the items of the order. That is, the order fulfillment system 100 translates the items of the order to the packing system 400 via the outbound conveyor 360. Upon arrival to the packing system 400, the packing selection system determines 410 a fulfillment station for the items of the order. The items of the order are translated to the packing conveyor 420 corresponding to the determined fulfillment station 410. In this example, one item is delivered to the fulfillment station for packaging. Another item of the order is recirculated about the packing conveyor 420 until the fulfillment station 430 is ready to receive the additional items of the order. The items of the order are packaged at the fulfillment station 430 by an operator of the order fulfillment system. The packaged order is translated to the output point 440 by an operator of the order fulfillment system 100 and sent to the customer.

For example, the necklace and dress (on their respective hangars) are transported to the packing system on an overhead garment trolley system that couples the storage system to the packing system. While being transported, the packing selection system reads the QR codes of the hangars and determines the fulfillment station of the order. The dress and necklace are transported to the packing conveyor system associated with the determined fulfillment station. The dress arrives at the fulfillment station first. An operator of the order fulfillment system verifies that the dress is intended for the order associated with the receiving fulfillment station by scanning the QR code. Upon verification, the operator removes the dress from the hangar, folds the dress, and packages the dress in a box. The necklace arrives at the fulfillment station second. However, the order fulfillment system determines that the operator has not finished packaging the dress and recirculates the necklace on the packing conveyor system. Once the dress is packaged, the necklace arrives at the fulfillment station and is similarly packaged. After the order has been packaged, an operator of the order fulfillment system transports the box to the output point and mails the order to the customer.

IV: Storage and Fulfillment Policies

As previously described, the order fulfillment system uses various elements to determine a storage location. Determining the storage location for each item of the population can be based on a storage policy of the order fulfillment system. The storage policy for the order fulfillment system selects storage locations to facilitate efficient storage of items of the population in the storage system.

In one embodiment, the storage policy can be based on a storage level of each storage carousel. In this example, the order fulfillment system monitors a storage level of each storage carousel representing how many storage locations are available on each storage carousel. Thus, the order fulfillment system can select to store items on storage carousels based on the number of available storage locations. In some cases, the storage location may only select a storage location for item storage once it is nearly empty (e.g., 30% full, a threshold number of storage locations etc.). Similarly, the order fulfillment system can select storage locations for a series of items received from the input system on a single storage carousel. For example, the order fulfillment system can determine storage locations for a series of items on the same storage carousel to 'fill' the storage carousel (i.e. from 30% full to 100% full, etc.).

In another embodiment, the storage policy can be based on the set of item characteristics. In one example, the order fulfillment system can store only one type of characteristic (or combination of characteristics) on a specific storage carousel or platform. For example, all items above a certain length are stored on the third storage platform, all accessories are stored on a specific storage carousel, etc.

In another embodiment, the storage policy can be based on the distribution of items (and/or item characteristics) on a storage platform or storage carousel. In this example, the order fulfillment system monitors the characteristics of items on a storage carousel or storage platform. Thus, the order fulfillment system can select to store items on storage carousels to achieve a desired distribution of items across the carousel. For example, the storage policy may dictate that each carousel include a distribution of 20% accessories, 30% pants, 40% dresses, and 10% outerwear in its storage locations. Accordingly, the storage selection system determines a storage location based on obtaining the desired distribution.

In another embodiment, the storage policy can be based on when an item is received (or ordered). For example, items can be stored or retrieved in waves. That is, the items are translated to a specific storage platform in a wave such that groups of items reach the storage platform at the same time. This allows an operator of the order fulfillment system to store groups of items at the same time. Similarly, groups of items from multiple orders can be released for retrieval in waves by the order fulfillment system. This allows an operator of the order fulfillment system to retrieve groups of items at the same time rather.

As previously described, the order fulfillment system uses various elements to determine a packing station for the order. Determining the packing station for each order can be based on a fulfillment policy for the order fulfillment system. The fulfillment policy for the order fulfillment system selects packing stations to facilitate efficient fulfillment of orders in the packing system 400.

In one embodiment, the fulfillment policy is based on items from the order being in circulation. An item is considered in circulation once it reaches a specific location on the outbound conveyor. In this example, a packing station for the order is not determined until all items from the order are in circulation.

In another embodiment, the fulfillment policy is based on the orders being processed, or previously processed, by each packing station. In this example, each order waits for a threshold number of packing stations to become available. Once the threshold number of packing stations available, the order fulfillment determines the packing station based on the number of previously processed orders at each packing station. In a similar example, each packing station is only selected to fulfill and order if it is not currently processing other orders.

The storage and fulfillment policies of the order fulfillment system can include any combination of policies. The order fulfillment system can additionally include any number of other storage and fulfillment policies. Whatever the configuration, the storage and fulfillment policies of the order fulfillment system work to maximize the throughput of the order fulfillment system.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system 300, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method comprising:
storing a population of items on a group of storage carousels according to a storage policy, the storage policy distributing items having a common characteristic across multiple carousels, and each storage carousel storing a portion of the population of items and adjacent to a carousel interaction station;
receiving an item order including a set of identifiers, each identifier associated with an item of the population;
for each identifier of the item order,
determining, using a control system, a storage carousel of the group of storage carousels that contains the item associated with the identifier of the item order;
actuating the determined storage carousel such that the item is advanced to the carousel interaction station for the carousel;
determining, using the control system, a fulfillment station of a plurality of fulfillment stations for packaging the item;
transporting the item to the determined fulfillment station; and
packaging the transported items at the determined fulfillment station.

2. The method of claim 1, wherein storing a population of items on a group of storage carousels further comprises:
associating a storage location with each item of the population, the storage location a representation of a position on the storage carousel.

3. The method of claim 1, wherein transporting the item further comprises:
recirculating the item on a packing conveyor until the fulfillment station is ready to receive the item.

4. The method of claim 1, wherein the group of storage carousels are coupled to a set of storage platforms and the storage platforms are configured in a multi-tiered structure.

5. The method of claim 1, further comprising:
determining the storage carousel of the group of storage carousels to store each item of the population according to the storage policy.

6. The method of claim 1, wherein determining the fulfillment station of the plurality of fulfillment stations for packaging the item is based on a fulfillment policy.

7. The method of claim 1, wherein every item in the population of items is a unique item, and the identifier for each item is a unique identifier of a plurality of unique identifiers for the population of items.

8. The method of claim 1, further comprising:
receiving a new item from a user of the order fulfillment system; and
classifying the new item as an item of the population of items.

9. The method of claim 8, wherein classifying the new item further comprises:
determining a set of item characteristics for the new item; and
generating an identifier for the new item, the identifier for tracking the new item within the population of items, and wherein the identifier is associated with the set of item characteristics for the new item.

10. The method of claim 9, wherein a visual representation of the identifier is affixed to the new item before storage on a storage carousel of the group of storage carousels.

11. The method of claim 1, further comprising:
receiving the item order from a customer; and
sending the items of the item order to the customer.

12. A system comprising:
an input system comprising:
a group of classification stations for classifying items of a population of items;
a storage system coupled to the input system, the storage system comprising:
a group of storage carousels, each storage carousel storing a portion of the population of items according to a storage policy, the storage policy distributing items having a common characteristic across multiple carousels, and
a group of carousel interaction stations, each carousel interaction station adjacent to a storage carousel of the group of storage carousels;
a packing system coupled to the storage system, the packing system comprising:
a plurality of fulfillment stations for packaging items; and
a control system configured to
receive an item order including a set of identifiers, each identifier associated with an item of the population of item,
determine storage carousels of the group of storage carousels that contains the items associated with the identifiers of the item order;
actuate the determined storage carousels such that the items are advanced to the carousel interaction station for the storage carousel, and
determine a fulfillment station of the plurality of fulfillment stations to package the items.

13. The system of claim 12, wherein the storage system is coupled to the packing system by an automated conveyor system.

14. The system of claim 12, wherein carousel interaction station comprises a visual indication system that indicates when the items of the order have been advanced to the appropriate position.

15. The system of claim 12, wherein the input system further comprises an input point for receiving the items of the population.

16. The system of claim 12, wherein the output system further comprises an output point for sending the orders to a customer.

17. The system of claim 12, wherein the storage system further comprises a plurality of storage platforms, the storage platforms for coupling the storage carousels and carousel interaction stations, and wherein the storage platforms are arranged in a vertical structure.

18. The system of claim 12, wherein the packing system further comprises a packing conveyor coupled to the fulfillment station, the packing conveyor recirculating items of the order until the items are ready to be packed.

19. The system of claim 12, wherein the input system is coupled to the storage system by an automated conveyor system.

20. The system of claim 12 further comprising an operator, the operator to translate items of the order between systems.

21. The system of claim 20, wherein the operator is an automated robotic system.

* * * * *